United States Patent [19]
Eriksson et al.

[11] Patent Number: 5,764,064
[45] Date of Patent: Jun. 9, 1998

[54] METHOD AND DEVICE FOR IDENTIFYING SINGLE GROUND FAULTS

[75] Inventors: Leif Eriksson, Sala; Murari Mohan Saha, Västerås, both of Sweden

[73] Assignee: ASEA Brown Boveri AB, Västerås, Sweden

[21] Appl. No.: 604,981

[22] PCT Filed: Sep. 28, 1994

[86] PCT No.: PCT/SE94/00892

§ 371 Date: Mar. 1, 1996

§ 102(e) Date: Mar. 1, 1996

[87] PCT Pub. No.: WO95/09467

PCT Pub. Date: Apr. 6, 1995

[30] Foreign Application Priority Data

Sep. 30, 1993 [SE] Sweden ............... 9303186-2

[51] Int. Cl.⁶ ............................................. G01R 31/14
[52] U.S. Cl. ................ 324/509; 324/522; 324/543; 361/88
[58] Field of Search ...................... 324/509, 521, 324/522, 86; 361/113, 82

[56] References Cited

U.S. PATENT DOCUMENTS

| | | | |
|---|---|---|---|
| 3,590,368 | 6/1971 | Esclangon | 324/51 |
| 3,958,153 | 5/1976 | Narayan | 361/86 |
| 4,196,463 | 4/1980 | Dickerson | 361/113 |
| 4,251,766 | 2/1981 | Souillard | 324/52 |
| 4,313,169 | 1/1982 | Takkagi et al. | 364/492 |
| 4,352,137 | 9/1982 | Johns | 361/82 |
| 5,399,974 | 3/1995 | Eriksson et al. | 324/521 |
| 5,446,387 | 8/1995 | Eriksson et al. | 324/522 |

OTHER PUBLICATIONS

Eriksson, Leif, "An Accurate Fault Locator with Compensation for Apparent Reactance in the Fault Resistance Resulting from Remote-End Infeed", IEEE Trans. on PAS, V.104, N.2, p. 427, Feb. 1985.

*Primary Examiner*—Ernest F. Karlsen
*Assistant Examiner*—Thomas Valone
*Attorney, Agent, or Firm*—Watson Cole Grindle Watson, P.L.L.C.

[57] ABSTRACT

A method and a device for identifying, when a fault has been detected in a power network, single-phase to ground faults by determining for each phase an auxiliary current based on the present phase current, ground fault current and ground current. If the difference between two consecutive, calculated values of the auxiliary current in some phase is smaller than a predetermined limit value, this means that there is a single ground fault in this phase.

3 Claims, 1 Drawing Sheet

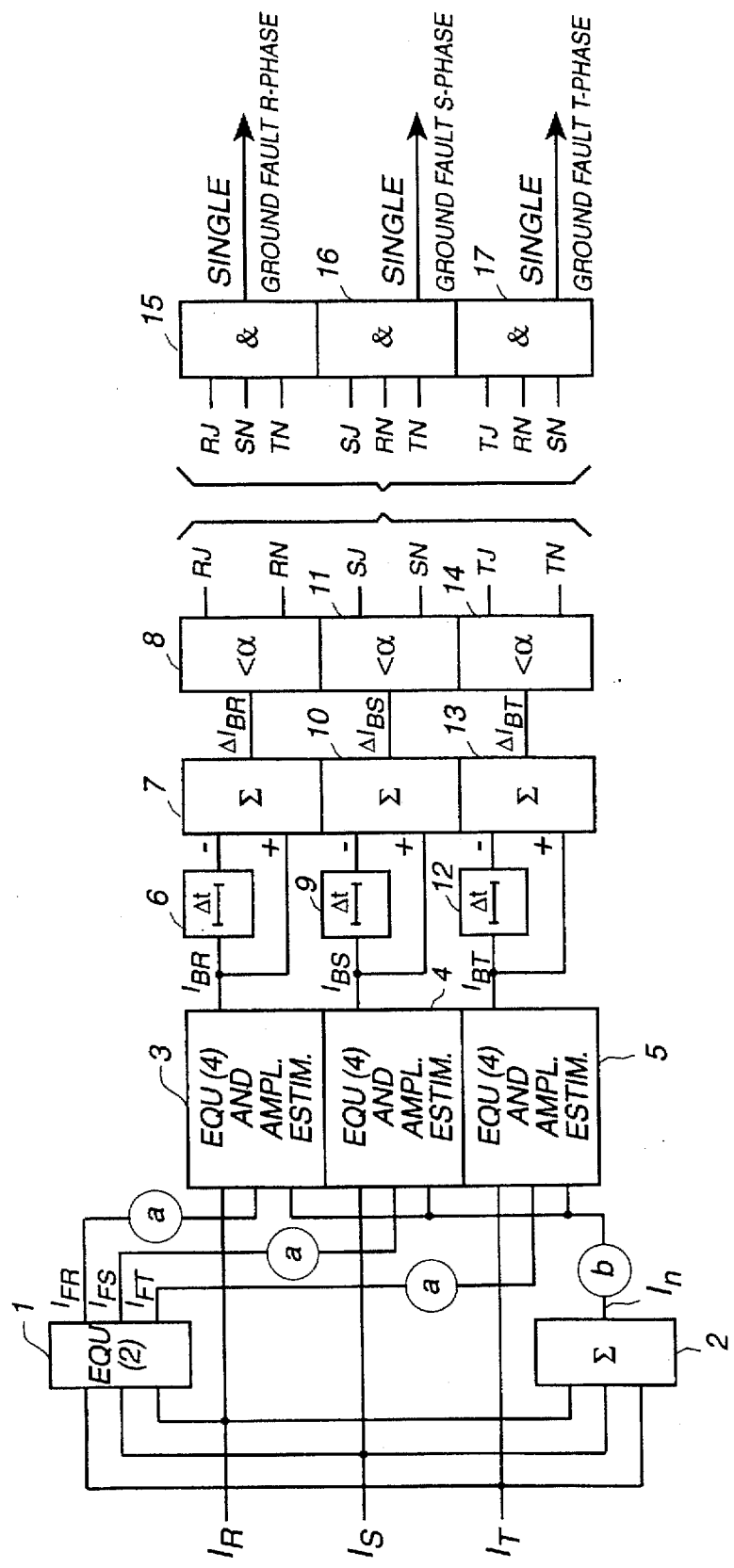

METHOD AND DEVICE FOR IDENTIFYING SINGLE GROUND FAULTS

This application is a 371 of application No. PCT/SE94/00892, filed Sep. 28, 1994.

TECHNICAL FIELD

For protection of cables and overhead lines in a power network, normally so-called distance protections are used. These protections are often based on the impedance principle, that is, they indicate a fault when the quotient of voltage and current measured at a measuring point is lower than a pre-set value. Besides being able to indicate faults and hence initiate disconnection of the phase or phases which is or are faulted, these protections also have other properties which extend the protective effect, such as directional and reach properties. Furthermore, they can be used for calculating the distance from a measuring station to a possible fault and can also calculate the magnitude of the fault resistance.

BACKGROUND ART, DISCUSSION OF THE PROBLEM

When a fault has been indicated, it is desirable to be able to take different measures depending on the type of fault, for example if it is a single-phase or a multi-phase fault. If it is known that it is a single-phase fault, normally the faulty phase is disconnected and a new connection is made after a short while, for example after half a second. The reason for doing so is that a single-phase fault is often a fault of a very short duration. Therefore, this method entails a minimum of disturbances on the power network.

Now, however, even if it really is a question of a single-phase fault, it is possible, because of zero-sequence currents and other current supply to the non-faulted phases, that the protections for the other phases also indicate a fault which leads to tripping of all the phases. This, in turn, leads to unnecessarily heavy disturbances on the power network.

When studying the occurrences of faults, it has turned out that 75–85% of all faults in a power network originate from single-phase faults. It would therefore be of great value to be able to determine in a very fast manner whether a fault which has occurred on a power network is a single-phase fault or not. The present invention permits a possibility of determining, as soon as a fault has occurred, whether the fault is single-phase fault. This, in turn, means that unnecessary disconnection of more phases than the faulty one can be avoided.

To be able to place the invention in its proper context and also to be able to demonstrate the value of the invention, a relatively detailed description of the state of the art as regards the use of a distance protection as a fault locator, and of the problems which are associated with the current technique within this field, will first be given.

The basic criterion for tripping of a power transmission line, in which a distance protection based on the impedance principle is used, is based on a check whether $$|Z|=|U_A/I_A|<Z_{in} \tag{1}$$

that is, whether the numerical value of the impedance determined with the aid of phase voltage $U_A$ and phase current $I_A$ is smaller than a preset value $Z_{in}$. This check can suitably be performed with a common underimpedance relay with a setting $Z_{in}$ lower than the normal load impedance.

When the distance protection is to be used as a fault locator, however, a considerable extension of the basic concept is required to achieve the desired accuracy and speed in the evaluation when a fault has been indicated on the power transmission line.

Most fault locators are based on measuring the reactance between a short-circuit and that end of the power transmission line where the fault locator is placed. However, the accuracy in the distance calculation is influenced by the fault resistance. The reason for this is that the current which flows through the fault resistance is somewhat offset in phase in relation to the phase position of the current measured at the end of the power transmission line. This means that the fault resistance is interpreted as an apparent impedance with one resistive and one reactive component. It is this reactive component which gives rise to the inaccuracy or the fault in the distance calculation since it influences the measured reactance.

The principles of fault location and calculation of fault resistance in connection with the occurrence of a fault on a protected line distance are known from a plurality of publications, some of which will be described below. The basic material consists of measured values obtained with the aid of instrument transformers for voltage and current at a measuring station adjacent to the protected line. These measured values are applied to a model of the network in question, which model is built into the distance protection. The current technique comprises A–D conversion and filtering of the measured values which then, via different distance protection equations for the model, determine the distance to the fault and the magnitude of the fault resistance.

A fault locator is described in an article entitled "An accurate fault locator with compensation for apparent reactance in the fault resistance resulting from remote-end infeed" published in IEEE Transaction on PAS, Vol. PAS-104, No. 2, February 1985, pp 424–436. Besides taking into account the impedance $Z_1$ of the power transmission line, this fault locator also takes into account the source impedances of the power transmission line to be able correctly to describe the network and the effect of feeding to the fault point of current from both directions. According to this method, sampled phase currents $I_R$, $I_S$ and $I_T$, measured at a measuring station A at one end of the line and designated $I_A$ below, are memorized to be able to determine the change in the phase currents at the measuring station which arises when a fault occurs, that is, the current change $I_{FA}$ equal to the present phase current $I_A$ after the occurrence of a fault less the phase current prior to the occurrence of the fault. The method of obtaining a measure of the current change $I_{FA}$ described above requires an extensive memory capacity and the method of calculation is relatively time-consuming.

Because the current IF which flows through the fault resistance has a current contribution also from a supply station at the other end of the power transmission line, $I_F$ will be different from $I_{FA}$. The relationship between these can be determined with the aid of the distribution factor of the network. The equations which can be set up in this way allow a possibility of determining both the current $I_F$ through the fault, the fault resistance and the distance to the fault. This method of obtaining the current $I_F$ through the fault resistance, however, is not particularly suitable when great demands are placed on rapid protective functions. The reason for this is, among other things, that currents both prior to and after the occurrence of a fault are Fourier filtered to obtain the fundamental components of the currents, and the method of calculation for solving the equations set regarding the distance to a fault, etc., are relatively extensive. Measurement at two separate times also makes it difficult to obtain a common phase reference, especially in case of deviation from the nominal frequency.

Swedish patent application SE 9201972-8 describes a method of determining the current $I_F$ in a very fast manner, which is based on the zero-sequence-free part of that current change which takes place in connection with the fault. The method for evaluation of the current $I_F$ is based on the sum $I_{FA1,2}$ of the changes in the positive-sequence and negative-sequence components at a measuring station A. It is here assumed that $I_F$ is equal to a linear combination of the sum of measured current samples for each phase at two adjacent points in time $t_1$ and $t_2$, and wherein each one of these sampled values is multiplied by its own coefficient which is chosen in such a way that the current $I_F$ is in phase with the positive-sequence and negative-sequence changes. The equation for $I_F$ will thus have the following form:

$$I_F = k_{R1} \cdot I_{R1} + k_{R2} \cdot I_{R2} + k_{S1} \cdot I_{S1} + k_{S2} \cdot I_{S2} + k_{T1} \cdot I_{T1} + k_{T2} \cdot I_{T2} \qquad (2)$$

where $I_{R1}$, $I_{S1}$ and $I_{T1}$ are simultaneous current sample values in the R, S and T phases at the time $t_1$ and the corresponding $I_{R2}$, $I_{S2}$ and $I_{T2}$ are simultaneous current sample values at the time $t_2$. An example of this assumption and one of many alternative methods of obtaining the coefficients $k_{R1}$, $k_{R2}$, $k_{S1}$, and so on, are mentioned in the above-mentioned patent specification.

Swedish patent application SE 9203071-7 describes a fault model of a line network, which also takes into account the zero-sequence impedance of the network in that also the sum current $I_N$, also called ground current, that is, $$I_N = I_R + I_S + I_T = 3 \cdot I_0 \qquad (3)$$

where $I_R$, $I_S$ and $I_T$ are the respective phase currents and $I_0$ is the zero-sequence current, will be included in the equations which can be set up to determine the fault parameters.

Although, in principle, having access to the parameters of the network and the phase currents $I_A$ and $I_F$ and $I_N$, it is now possible to calculate the distance to a fault and the fault resistance, one practical problems remains, however, namely, to rapidly obtain a correct value of the phase current immediately before the occurrence of a fault. According to the above-mentioned IEEE Transactions on PAS, Vol. PAS-104, No. 2, February 1985, pp 424–436, sampled values of the phase currents are memorized continuously to be able to determine the current changes on the occurrence of a fault. This requires extensive data capacity. To obtain the fundamental tone of the phase currents, freed from harmonics and d.c. components, normally also a Fourier processing is performed to determine the amplitude and the phase.

Other methods for amplitude determination of the measured currents are also available. One such method comprises finding out the peak value with the aid of two consecutive sampled values for each cycle. Such a method is described, inter alia, in "High-speed distance relaying using a digital computer, Part 1—System Description", IEEE Trans on Power Apparatus and Systems, Vol-91, No. 3, May/June 1972, pp 1235–1243 by G. B. Gilchrest, G. D. Rockefeller and E. A. Udren. The peak values which are obtained in this way under normal conditions, that is, before the occurrence of a possible saturation, are relevant measured values which correspond to the Fourier amplitudes. When upon saturation or under other conditions, harmonics, d.c. components, etc., occur, peak values determined by means of this method will, however, be influenced.

Apparently, the accuracy during fault determination increases if both the fault current $I_F$ and the ground current $I_N$ according to the above are taken into account. This is true, in principle, of both single-phase and multi-phase faults. The conditions in the event of a single-phase fault are, however, more complex because of the voltage drop in the ground current circuit and a normally higher fault resistance. The need of a more accurate calculation is, therefore, greater in case of a single-phase fault. By rapidly obtaining information that a fault is a single-phase fault, it is therefore possible to determine whether the more accurate method of calculation for obtaining the distance to the fault, etc., is necessary. If a detected fault is not a single-phase fault, that is, it is a multi-phase fault, a more simple method can be used, based on the phase currents for calculating the distance to the fault, etc.

On the basis of the above reasoning and what has been stated in the introduction under the background art regarding single-phase faults, it is clear that it is of great value to be able rapidly to determine, after a fault has been detected, whether the fault is a single-phase or a multi-phase fault. A method and a device according to the invention enable such a fast identification.

SUMMARY OF THE INVENTION

As will have been clear from the above discussion of the problems, the invention relates to a method and a device for identifying single ground faults, that is, when a fault occurs which can be interpreted as a multi-phase fault but which actually is a single-phase fault, for determining unambiguously that it is a single-phase fault.

The invention comprises calculating with the aid of the measured phase currents $I_{R,S,T}$ after a fault has been detected, that is, containing both the present load and fault currents, the ground fault currents $I_{FR,FS,FT}$ through the fault, preferably calculated according to the method described in SE 9201972-8, and the ground current $I_N$ determined according to equation (3) above for each phase, an auxiliary current according to $$I_{BR,BS,BT} = I_{R,S,T} - a \cdot I_{FR,FS,FT} - b \cdot I_N \qquad (4)$$

where $I_{BR}$ is obtained based on $I_R$, $I_{FR}$ and $I_N$ and the corresponding applies to the S and T phases.

If a fault detected in a power network is a single-phase fault, the amplitude value of this auxiliary current will be practically constant for the faulted phase but will vary very noticeably for the non-faulted phases. In this way, the invention permits a simple and unambiguous method for determining whether it is a single-phase fault while at the same time the faulty phase is identified.

By a suitable choice of coefficients "a" and "b", the auxiliary current also constitutes a measure of the present load current in the faulty phase, that is, generally also the corresponding value of the load current prior to the occurrence of the fault in this phase. A suitable choice means that the coefficient "b" should be between 0.3 and 0.4, that is, $$0.3 < b < 0.4$$

and that a=2b.

To obtain the desired speed in the evaluation of whether it is a single ground fault, after filtering of disturbances of high frequency contents, an amplitude estimation of the auxiliary current is performed in a known manner, for example according to method described in IEEE Trans on Power Apparatus and Systems, Vol-91, No. 3, May/June 1972, pp 1235–1243. Now, if two consecutive amplitude-estimated values of the auxiliary current of one phase differ from each other to a smaller extent than a low value determined in advance and it at the same time there is a considerable difference between two consecutive amplitude-estimated values of the other phases, this means that a single-phase fault has been identified, that is, that phase where the change in amplitude is very small.

Since the amplitude of the currents $I_A$, $I_F$ and $I_N$ included in the auxiliary current can be determined near the time of the occurrence of the fault, any problems in connection with phase drift are also prevented.

BRIEF DESCRIPTION OF THE DRAWING

The drawing FIGURE is a schematic block diagram of a device for detecting single ground faults in accordance with the present invention.

DESCRIPTION OF THE INVENTION

A device for carrying out the method according to the invention is clear from the accompanying FIGURE. It is then assumed that there is continuous access to all the phase currents $I_R$, $I_S$, $I_T$.

When a fault has been detected, it is possible, with the above equation (2) and with knowledge of the constants included therein, to calculate via the present phase currents the current $I_F$ through the fault of the different phases, that is, $I_{FR}$, $I_{FS}$ and $I_{FT}$. This calculation takes place in a ground fault calculator 1.

If the power network has a grounded neutral point, then, if a ground fault occurs, a ground current $I_N$ will occur according to equation (3). This can then be calculated by adding the phase currents in a ground current calculator 2, the output of which produces the ground current $I_N$.

Calculation of the auxiliary current of the different phases, that is, $I_{BR}$, $I_{BS}$ and $I_{BT}$ according equation (4) then takes place in the auxiliary current calculator 3, 4 and 5. The auxiliary current calculator 3 for calculating the auxiliary current for phase R, that is, $I_{BR}$, is supplied with the phase current $I_R$, the ground fault current for phase R, that is, $I_{FR}$ multiplied by the coefficient "a" and the ground current $I_N$ multiplied by the coefficient "b". In a corresponding manner, phase current, ground current and current through the fault for phases S and T are supplied to the auxiliary current calculator 4 and 5.

To be able to eliminate disturbances with high frequency contents and also to be able rapidly to obtain a measure of the auxiliary currents, a filtering and an amplitude estimation of the calculated also take place in the auxiliary current calculators 3, 4 and 5.

By comparing two consecutive values of the auxiliary currents for each phase, obtained in the manner described above, it can be determined whether any change $\Delta I_B$ has taken place in connection with the occurrence of a fault. For the R phase, $\Delta I_{BR}$ is obtained with the aid of a time-lag unit 6 and a summator 7. The corresponding comparison for the S and T phases is made with the aid of a time-lag unit 9 and a summator 10 and with the aid of a time-lag unit 12 and a summator 13, thus obtaining a measure of $\Delta I_{BS}$ and $\Delta I_{BT}$.

The changes for each phase, obtained in the above-described manner, are compared in a comparison device (8, 11, 14) for each phase with a predetermined limit value $\alpha$. Now, if $\Delta I_{BR}$ is smaller than the limit value $\alpha$, for example 10% of the rated current $I_n$ of the power network, a signal RJ is obtained. According to what has been stated previously, this means that at the same time $\Delta I_{BS}$ and $\Delta I_{BT}$ must then be considerably greater than $\alpha$, which results in the comparison device for the S phase and the comparison device for the T phase indicating this by delivering the signals SN and TN, respectively. Generally, thus, the rule applies that when the $\Delta I_B$ values are smaller than $\alpha$, fault signals RJ, SJ or TJ are obtained, whereas if the $\Delta I_B$ values are greater than $\alpha$, nonfault signals RN, SN and TN are obtained.

Having access to these signals, there are now possibilities of identifying a single ground fault in any phase. A single ground fault in the R phase is identified via an AND element 15 if now the comparison devices 8, 11 and 14 produce the signals RJ, SN and TN. In similar manner, a single ground fault in the S phase is identified via an AND element 16 if the comparison devices produce SJ, RN and TN and a single ground fault in the T phase is identified via an AND element 17 if the comparison devices produce the signals TJ, RN and SN. In other words, if comparator 8 produces an RJ signal and comparators 11 and 14 respectively produce an SN signal and a TN signal, the AND gate 15 being responsive thereto will produce a single ground fault response for the R phase. Similarly, if the comparator 11 produces an SJ signal and the comparators 8 and 14 produce RN and TN respectively, which signals are connected to the AND gate 16, a single ground fault in the S phase is established. Likewise, if the comparator 14 produces a TJ signal indicative of a fault and the comparators 8 and 11 produce RN and SN signals respectively, which signals are indications of nonfault conditions in the other phases and such signals are coupled to the AND gate 17, a single ground fault in the T phase is detected. It should be understood that if more than one fault signal occurs, then the logic associated with AND gates 15, 16 and 17 will not produce an indication of a single ground fault in accordance with the present invention.

The embodiment described above with reference to the accompanying drawing can be varied in many ways within the scope of the invention, for example with discrete components in a hybrid design, with mixed analogue and digital technique, in a more or less integrated way, designed as software, or in any other corresponding way.

We claim:

1. A method for identifying, after a fault has been detected, single-phase to ground faults in a power network of a three phase system of R, S and T phases with rated current $I_n$ and wherein, via the phase currents $I_R$, $_{ST}$ of the power network, the ground fault currents $I_{FR, FS, FT}$ for each phase, as well as the corresponding ground current $I_N$, can be calculated wherein an auxiliary current $I_{BR, BS, BT}$ for each phase is determined by calculation according to $$I_{BR, BS, BT} = I_{R, S, T} - aI_{FR, FS, FT} - bI_N$$

wherein a and b are pre-determined coefficients and wherein the calculation of the auxiliary current is based on amplitude estimation of the calculated values, and if two consecutive, amplitude-estimated calculated values of the auxiliary current for only one of said three phases when a fault has been detected, differ from each other to a smaller extent than a pre-determined limit value a, and at the same time there is a difference greater than a for the other two phases, this is interpreted as if a single-phase fault has occurred in one phase of the power network.

2. A method for identifying single-phase to ground faults in a power network after a fault has been detected according to claim 1, characterized in that $$a=2b \text{ and } 0.3<b<0.4$$

and that the limit value $\alpha<0.1\cdot I_n$.

3. A device in a three phase system of R, S and T phrases for identifying single-phase to ground faults after a fault has been detected, wherein, having access to all the phase currents $I_{R,S,T}$, the ground fault currents $I_{FR,FS,FT}$ are determined with the aid of a ground fault calculator and a ground current $I_N$ is determined with the aid of a ground current calculator compromising: auxiliary current calculators for determination and amplitude estimation of an auxiliary current for each phase according to $$I_{BR,BS,BT}=I_{R,S,T}-a\cdot I_{FR,FS,FT}-b\cdot I_N$$

where a and b are predetermined coefficients, units for determining the difference between two consecutive, determined, amplitude-estimated values of the auxiliary current, which units for each phase comprise a time-lag unit and a summator, a comparison device for each corresponding phase each of which compares the difference for each phase with a predetermined limit value $\alpha$, and if the difference for a phase is smaller than the limit value, the comparison device for the R phase delivers a signal RJ, the comparison device for the S phase delivers a signal SJ, and the comparison device for the T phase delivers a signal TJ, and if the difference is greater than the limit value, the comparison device for the R phase delivers a signal RN, the comparison device for the S phase delivers a signal SN, and the comparison device for the T phase delivers a signal TN, and an AND element for each phase, for identifying single ground fault in the R phase if the comparison devices deliver the signals RJ, SN, and TN, in the S phase if the comparison devices deliver the signals SJ, RN and TN, in and the T phase if the comparison devices deliver the signals TJ, RN and SN.

* * * * *